April 11, 1967   D. J. CARAVETTA ET AL   3,313,396
APPARATUS FOR FEEDING AND ORIENTING PLATE-LIKE ARTICLES
HAVING ECCENTRICALLY LOCATED PROJECTIONS
Filed Dec. 9, 1965                                                  2 Sheets-Sheet 2

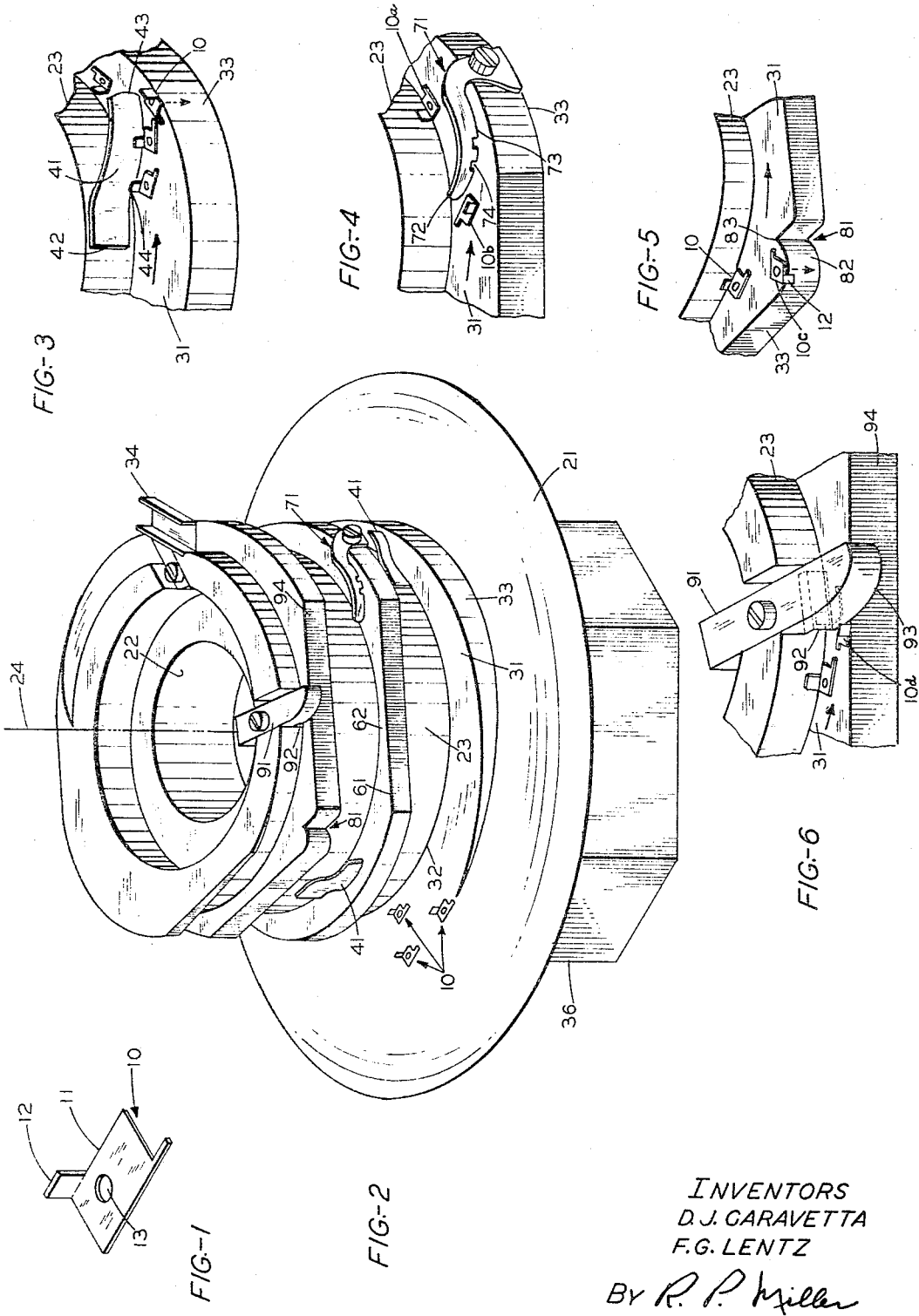

United States Patent Office 3,313,396
Patented Apr. 11, 1967

3,313,396
APPARATUS FOR FEEDING AND ORIENTING PLATE-LIKE ARTICLES HAVING ECCENTRICALLY LOCATED PROJECTIONS
Daniel James Caravetta, Easton, and Forrest George Lentz, Bethlehem, Pa., assignors to Western Electric Company, Incorporated, New York, N.Y., a corporation of New York
Filed Dec. 9, 1965, Ser. No. 512,739
9 Claims. (Cl. 198—33)

This invention relates to an orienting and feeding apparatus and more particularly to an apparatus for vibratory feeding and orienting plate-like articles having eccentrically located vertical projections.

In many automatic assembly operations it is necessary that commercial articles are fed to an automatic machine in a predetermined orientation. This requires an apparatus for orienting the articles so that they may be directed successively in the predetermined positions to a chute to feed the assembly machine. In the past, this has been accomplished by means of vibratory bowl feeders with ascending or descending tracks mounted on the circumferential surface of the bowl. Many of these feeders incorporate devices which merely pass correctly oriented articles moving along the track, and reject misoriented articles, by pushing them off the track to fall back into the supply bin for refeeding. Other devices use orienting vanes located along the vibratory track in combination with the application of a high energy pulse to the vibratory device to impart a mechanical jolt which forces the articles to flow in the same orientation.

An object of this invention is to provide a new and improved method and apparatus for orienting articles in a vibratory feeder.

A further object is to provide a simple device to be positioned along a feed track of a vibratory bowl feeder to orient a plurality of plate-like articles having eccentrically located angular projections that are moving along the track.

An additional object of this invention is to locate a device along a vibratory feed track to freely pass plate-like articles having eccentrically located vertical projections which are moving in a single orientation, and to intercept and rotate all misoriented articles into the single orientation.

With these and other objects in view, the present invention contemplates an apparatus for orienting articles having eccentrically located angular projections joined to a base plate, comprising an apertured stop positioned across a vibratory track to intercept and reorient all articles advancing along the track in a misoriented position. More particularly, the articles are fed up along a vibratory track having apertured stops positioned across the track at predetermined locations and spaced above the track base and away from a sidewall thereof to permit an article advanced to the stop with its projection adjacent the sidewall to freely pass the stop while an article with its projection on the side of the track away from the sidewall frictionally engages the stop and moves therealong. The frictional engagement of the projection with the stop, combined with the vibratory energy imparted to the track, pivots the article as the projection moves through one of the apertures in the stop whereafter the article is advanced along the track with the projection adjacent the sidewall.

These and other objects and advantages of the present invention will be apparent by reference to the following detailed description and the following drawings wherein:

FIG. 1 is a perspective view of a typical component that may be oriented by the apparatus constituting the present invention;

FIG. 2 is a perspective view of a vibratory feeding appartus with a showing of an orienting device embodying the principles of the present invention;

FIG. 3 is a perspective view of an orienting device positioned across a track for thinning out articles moving in groups and articles which are interlocked one with another.

FIG. 4 is a view of a principal embodiment of this invention which passes oriented articles and intercepts and orients misoriented articles;

FIG. 5 is a perspective view of another orienting device for ejecting articles moving in frictional engagement with an edge of the vibratory track;

FIG. 6 is a perspective view of an additional orienting device positioned across a vibratory track for passing only those articles moving with the desired orientation;

Figure 7:
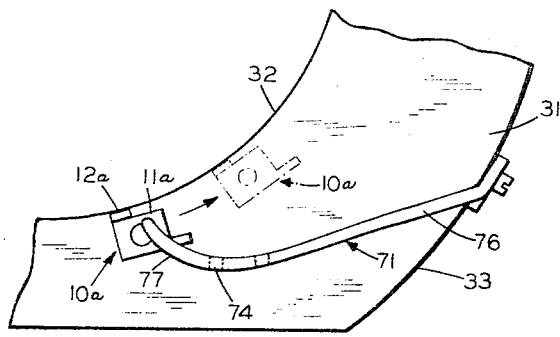
FIG. 7 is a plan view of the embodiment shown in FIG. 4 positioned across a vibratory track showing the free passage of correctly oriented component articles.

Referring to FIG. 2, there is shown a vibratory apparatus for orienting and feeding a plurality of articles such as a base tab 10 (see FIG. 1). The base tab 10 is comprised of a base plate 11, with an aperture 13 therein and having an eccentrically located plate projection 12 joined thereto.

Attention is directed to FIG. 2 wherein the orienting and feeding apparatus is shown as being mounted on a circular supply base 21 on which is secured a cylindrically shaped bowl 22 having an external wall 23. The bowl 22 is concentrically disposed about a vertical center-line 24 of the apparatus.

A helically ascending track or shelf 31 is formed with an inner edge 32 integral with the external wall 23 of the bowl 22, and an unattached, curved outer edge 33. The shelf 31 extends from the supply base 21 and helically ascends around the external wall 23 of the bowl and terminates at the top of the bowl 22 in a connection to a supply chute 34. The supply chute 34 extends laterally away from the orienting apparatus to an assembly machine (not shown).

Any commercially available excitation source 36 (see FIG. 2) may be used to impart an oscillatory vibration to the bowl and shelf. The oscillatory vibration is constantly applied in one direction with a second oscillatory vibration intermittently applied in the opposite direction, whereupon the base tabs 10 are moved from the supply base 21 up along the helically ascending shelf 31 toward the supply chute 34.

Referring now to FIGS. 2 and 3–6, there are shown detailed views of a series of obstructions which are formed along the shelf to effect a single line feeding of the base tabs 10 in a predetermined orientation to the supply chute 34. The base tab 10 is in the predetermined orientation when the base plate 11 is horizontal and resting on the shelf 31 with the projection 12 positioned vertically upward and in contact with the external wall 23 of the bowl 22.

Attention is first directed to FIGS. 2 and 3 which depict another obstructing device 41 having a first end 42 attached to the wall 23 of the bowl 22 and a second free end 43 spaced from the outer edge 33 of the shelf 31. A bottom edge 44 is spaced above the shelf 31. The device 41 serves to thin out articles moving together in groups by forcing those articles toward the outer edge 33 of the shelf. Those base tabs farthest from the external wall of the bowl will be unable to pass between the second end 43 of the device 41 and the outer edge 33 of the shelf and will fall from the shelf onto the supply base 21. A plurality of obstructing devices 41 are used in the apparatus and are spaced at different levels along the shelf. The distance between the free end 43 of each device and the outer edge of the shelf decreases, the closer the device is positioned to the chute 34, to accomplish a single line feeding to the chute 34. Also, base tabs having their projections 12 interlocked with the aperture 13 of another tab will be unable to pass between the free end 43 and the outer edge of the shelf and will fall to the supply base 21.

Attention is next directed to FIG. 2 which shows the outer curved edge 33 of the shelf 31 cut along a chordal line 61 to form a narrowed ledge-like portion 62 between the chordal line 61 and the external wall 23 of the bowl 22. The width of the ledge-like portion 62 is less than twice the width of the base plate 11 of an article. When base tabs moving in other than a single line along the shelf 31 traverse the ledge-like portion 62, those base tabs abreast of tabs adjacent the external wall 23 of the bowl will fall from the shelf onto the supply base 21 for refeeding.

Referring to FIGS. 2 and 4, there is shown a finger-like member 71 which is angularly positioned across the shelf 31 with a curved leading end 72 spaced from the external wall of the bowl and a bottom edge 73 of the member 71 spaced above the shelf 31. The bottom edge 73 has a plurality of slotted apertures 74 formed therein. The member 71 is attached to the outer edge 33 of the shelf 31.

It will be recalled that the tabs 10 approaching the finger-like member 71 are advancing in a single file due to the structure of the chordal ledge 62 which rejects those tabs advancing two-abreast. Base tabs 10a having the base plate 11 horizontal and the projection 12 vertically up and adjacent the external wall of the bowl may freely pass the member 71 with the vertical projection moving between the leading end 72 and the wall 23 of the bowl 22 and the base 11 passing under the bottom edge 73 of the member 71.

Base tabs 10b having the projection 12 away from the external wall of the bowl are intercepted by the leading end 72 of the member 71 and are moved therealong. The projection attempts to pass through one of the apertures 74 but the forces due to the vibration imparted to the shelf and member 71 engage the projection with an edge of the aperture and thereupon rotate the base about the projection.

Attention is next directed to FIG. 5 wherein a notch 81 having an apex 83 is formed in the curved outer edge 33 of the helical shelf 31. The notch 81 is shaped to have a curved transition 82 from the outer edge of the shelf which terminates in the apex 83 of the notch 81. The return edge of the notch 81 from the apex 83 to the outer edge of the shelf is at an acute angle to the external wall of the bowl. Base tabs 10c moving along shelf 31 with the projection 12 vertically downward (as illustrated in FIG. 5) and frictionally engaging the outer edge 33 of the shelf 31 move around the curved transition 82 into the notch 81 toward the apex 83. As the projection 12 moves into the notch, the vibrations imparted to the tab 10 by the source of excitation advances the tab over the edge of transition 82 and the tab falls from the shelf back onto the supply base 21.

Some of the base tabs will have been randomly placed on the supply base 21 in an inverted position with the juncture of the base 11 and the projection 12 above the shelf. As these articles move along the ledge-like portion 62, the projection 12 drops over the edge of the track with the base coming to rest against the shelf 31. These base tabs are then directed from the shelf by one of the notches 81.

The aforementiond modifications to the shelf and the obstructions therealong will generally orient the base tabs and confine their movement to a single line for feeding to the supply chute 34. There will be occasions, however, where some tabs will bcome misoriented or resume movement abreast of one another before reaching the supply chute. A final obstruction consists of a check stop 91 (see FIGS. 2 and 6) positioned across the shelf 31 rearward of the supply chute 34. The check stop 91 has an aperture 92 formed in a bottom edge 93 thereof adjacent the external wall 23 of the bowl. The bottom edge 93 of the check stop is spaced above the shelf 31 a distance slightly greater than the thickness of the base plate 11 of an article 10. In FIG. 6, the shelf 31 under the stop 91 has been cut to form a ledge-like portion 94.

OPERATION

In the operation of the apparatus, attention is first directed to FIG. 2 where a plurality of base tabs 10 are placed in a random manner on a supply base 21 near the lower end of the shelf 31. The excitation source is actuated to impart an oscillatory vibration to the base 21, bowl 22 and shelf 31, whereupon the base tabs are moved up along the shelf.

Articles moving together along the track are thinned out by the obstructing device 41 (see FIGS. 2 and 3) and a plurality of ledge-like portions 62 which permit the movement of base tabs in a single line only. (See FIG. 2).

Figure 8:
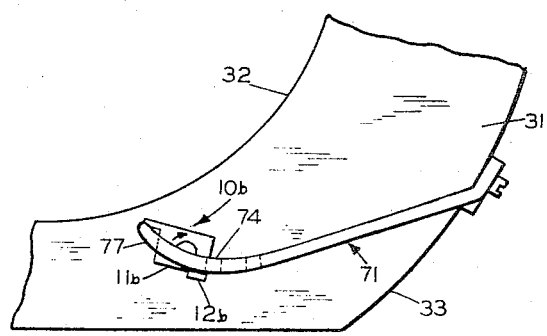
FIGS. 8–10 are plan views of the embodiment shown in FIG. 4 showing various movements of incorrectly directed components during reorientation into the proper feed direction.
Figure 9:
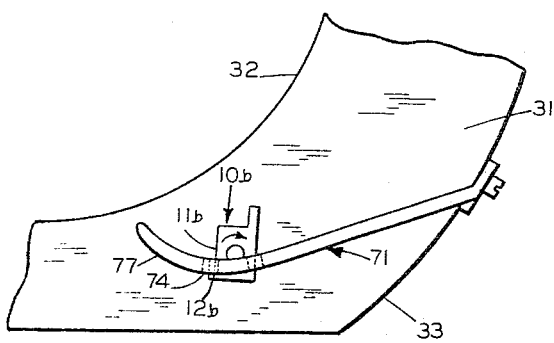
Figure 10:
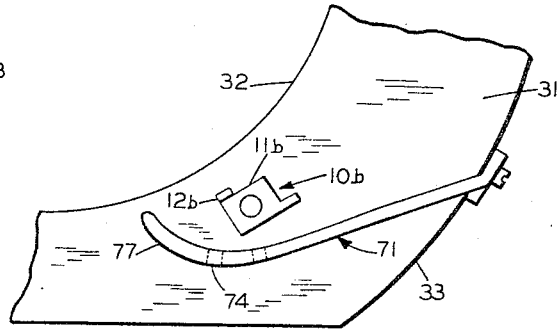

Base tabs 10a moving with the projection vertically up and against the external wall of the bowl pass between the leading end of the finger-like member 71 and the external wall of the bowl with the plate-like base passing under the member 71 (see FIG. 7). One embodiment of the finger-like member 71 (see FIGS. 7–10) is comprised of a linear part 76 having one end attached to the outer edge 33 of the shelf and another end joined to a curved part 77. The finger-like member 71 frictionally engages articles 10b with vertical projections away from the wall of the bowl (see FIG. 8) whereupon the articles are moved along the member 71. The vibrations imparted to the base 11 tend to advance the tab 10, but the tab is restrained by the projection 12 in one of the apertures 74 in the finger-like member. This restraining action on the projection and vibratory forces imparted to the bottom of the base plate 11 result in a turning torque being imparted to the tab. As a result, the tab will rotate until the projection is forced against the external wall 23.

A plurality of these members 71 may be spaced along the shelf to insure orientation of articles which become misoriented as they move along the shelf.

Base tabs 10c moving with the projection vertically down and engaging the edge of the shelf are removed to the supply base by the notch 81. Movement past the check stop 91 is restricted to oriented articles with the projection 12 passing through the aperture 92 and the base plate 11 passing under the bottom edge 93 (FIGS. 2 and 6). Misoriented articles 10d which are intercepted by the stop 91 move therealong and are directed off a ledge-like portion 94 and fall to the supply base. The base tabs are then moved to the supply chute 34 for delivery to the assembly machine.

What is claimed is:

1. An apparatus for orienting articles having a base plate with an eccentrically located projection joined thereto, comprising:
   inclined means enclosed along a first side thereof for conveying a plurality of articles with each base plate flat, and in contact with said conveying means and each projection normally extending vertically upward from said conveying means;
   first thinning means mounted on the first side of said conveying means and extending thereover to a predetermined distance from a second side of the conveying means for passing articles one at a time;
   second thinning means on said conveying means rendered effective by passage of articles moving abreast of other articles adjacent the first side of the conveying means for directing said articles from said conveying means;
   slotted means attached to said second side and extending over said conveying means toward said first side for intercepting articles having projections positioned toward said second side to pivot said articles for further movement with the projections positioned adjacent said first side;
   means on said conveying means rendered effective by passage of articles turned down with the projections engaging an edge along the second side of the conveying means for directing said articles from the conveying means;
   means extending across said conveying means and having an aperture therethrough for passing only those articles having the projections toward the first side of said conveying means; and
   means for imparting an oscillatory vibration to said conveyor means.

2. An apparatus for orienting articles having a base plate with an eccentrically located projection joined thereto, as defined in claim 1, wherein:
   said first thinning means comprises a curved, elongated member attached to a sidewall on the first side of the conveying means and having a bottom edge spaced above the conveying means to pass the base plate of the article.

3. An apparatus for orienting articles having a base plate with an eccentrically located projection joined thereto, as defined in claim 1, wherein:
   said second thinning means comprises a narrowed ledge-like portion formed along said conveying means at predetermined intervals, said ledge-like portion being less than twice the width of the base plate of an article.

4. An apparatus for orienting articles having a base plate with an eccentrically located projection joined thereto, as defined in claim 1, wherein:
   said means rendered effective by passage of articles turned down comprises a notch formed in the second side of said conveying means whereupon the advancing article moves the base plate over an edge of the notch to direct the article from the conveying means.

5. An apparatus for orienting articles having a base plate with an eccentrically located projection joined thereto, as defined in claim 1, wherein:
   said means for passing only those articles with projections toward a first side of the conveying means comprises a member laterally extending from a sidewall on the first side of the conveying means toward the second side thereof, and spaced above said conveying means a distance which is slightly greater than the thickness of said base plate, said member having said aperture formed therein to extend from the bottom of said member adjacent said sidewall, said conveying means having a ledge-like portion under said laterally extending member whereupon those articles having projections away from the first side of the conveying means are directed along the member and off said ledge-like portion.

6. An apparatus for orienting articles having an eccentrically located projection joined to a base plate, comprising:
   an inclined track having a wall formed along one side thereof;
   a finger-like member having an aperture formed in a bottom edge thereof;
   means for mounting the member to extend across the track with the bottom edge of the member raised above said track a distatnce slightly greater than the thickness of said base plate, said mounting means positioning the finger-like member with one end spaced from said wall a distance slightly greater than the thickness of said projection; and
   means for vibrating said track to move said articles therealong.

7. An apparatus for orienting articles having an eccentrically located projection joined to a base plate, as defined in claim 6 wherein:
   said finger-like member comprises a linear part extending from said mounting means and a curved part, extending from said linear part and terminating at said distance from said wall, said finger-like member having a plurality of apertures formed to extend from the bottom edge into said curved part.

8. In an apparatus for orienting articles wherein said articles comprise a base plate with an eccentrically mounted projection:
   a helically ascending track having a walled side and an outer side,
   a resilient member having a slotted aperture extending from a bottom edge a distance greater than the height of said projection,
   means for attaching said resilient member to the outer side of said track to extend over said track at a distance spaced from said track which is slightly greater than the thickness of said base plate, said mounting means positioning the end of said resilient member a distance from said walled side which is slightly greater than the thickness of said projection for intercepting articles whose projections are spaced from said walled side and guiding said articles along said member into said aperture, said aperture having walls spaced apart a distance slightly greater than the width of the projection, and
   means for vibrating the track and finger-like member to engage the walls of said aperture with a projection positioned within said aperture whereupon the vibrations imparted to the track tend to advance the base plate while the walls of the aperture restrain the projection and a turning torque is imparted to rotate the base plate away from said walled side and orient said article with the projection toward said walled side.

9. In combination an orienter and helical track for orienting flat articles having eccentric projections wherein the helical track is positioned adjacent an external wall of a cylindrical member subjected to vibratory forces which advance the articles along said track wherein the improvement comprises:
   said track is narrowed to provide a ledge which is less than twice the width of one of said flat articles whereupon the outer of two articles advancing abreast of each other along said track is forced off of said ledge portion;
   an orienting member spaced from said track in a position beyond said ledge in the direction of movement of said articles and in a position to project angularly toward said external wall with a tip of the member spaced therefrom to pass articles having projections riding along said wall and to intercept projections spaced from said wall whereupon said vibratory forces rotate said intercepted flat articles about said projections and beneath said member; and said member having a slot extending from the bottom surface thereof and positioned from the tip a distance sufficient to allow said intercepted articles to complete their rotation and the slot being of sufficient size to allow said projection to pass therethrough.

References Cited by the Examiner

FOREIGN PATENTS 572,520  3/1959  Canada.

EVON C. BLUNK, Primary Examiner.

RICHARD E. AEGERTER, Examiner.